US005168451A

United States Patent [19]

Bolger

[11] Patent Number: 5,168,451

[45] Date of Patent: Dec. 1, 1992

[54] USER RESPONSIVE TRANSIT SYSTEM

[76] Inventor: John G. Bolger, 469 Tahos Rd., Orinda, Calif. 94563

[21] Appl. No.: 662,351

[22] Filed: Feb. 28, 1991

Related U.S. Application Data

[63] Continuation-in-part of Ser. No. 425,819, Oct. 23, 1989, abandoned, which is a continuation-in-part of Ser. No. 111,037, Oct. 21, 1987, abandoned.

[51] Int. Cl.[5] ............................................ G06F 15/50

[52] U.S. Cl. .................................... 364/436; 340/994

[58] Field of Search ........... 364/436, 444, 443, 424.01, 364/437, 438; 340/991, 993, 994

[56] References Cited

U.S. PATENT DOCUMENTS

| | | | |
|---|---|---|---|
| 3,568,161 | 3/1971 | Knickel | 340/993 |
| 3,644,883 | 2/1972 | Borman et al. | 340/991 |
| 3,646,580 | 2/1972 | Fuller et al. | 340/993 |
| 4,015,804 | 4/1977 | Dobler et al. | 364/436 |
| 4,092,718 | 5/1978 | Wendt | 364/436 |
| 4,093,161 | 6/1978 | Auer, Jr. | 246/5 |
| 4,212,069 | 7/1980 | Baumann | 364/467 |
| 4,220,946 | 9/1980 | Henriot | 364/436 X |
| 4,350,969 | 9/1982 | Greer | 340/994 |
| 4,412,292 | 10/1983 | Sedam et al. | 364/479 |
| 4,713,661 | 12/1987 | Boone et al. | 340/994 |

*Primary Examiner*—Thomas G. Black

*Attorney, Agent, or Firm*—Owen, Wickersham & Erickson

[57] ABSTRACT

A transit system includes a number of service request terminals located at frequent placement intervals in local areas served by the transit system. Transit vehicles flow throughout the local service area without predetermined routes or schedules. Movement of the vehicles is determined solely by the dispatches assigned to them in real time in response to service request. Passengers use the service request terminals to transmit a service request to a central dispatch controller that receives the request and automatically dispatches the most efficient vehicle to service the request. The central computer determines the most efficient vehicle by calculating the total added travel distance to service the request and destination in relation to the dispatches previously assigned to each vehicle. The service request is dispatched to the vehicle which would have the minimum added travel distance. The dispatched vehicle has a terminal that receives the dispatch command that was transmitted by the central dispatch controller and enters it on a graphical display of a map of the local area for convenient viewing by the vehicle operator. The order in which dispatches are serviced and the path traveled by the vehicle between dispatch locations is determined by the vehicle operator, so as to allow continuous modification in response to new dispatches, prevailing traffic conditions, etc.

39 Claims, 6 Drawing Sheets

USER RESPONSIVE TRANSIT SYSTEM

BACKGROUND OF THE INVENTION

This application is a continuation-in-part of application Ser. No. 07/425,819 now abandoned filed on Oct. 23, 1989 which is a continuation-in-part of application Ser. No. 07/111,037 now abandoned, filed on Oct. 21, 1987.

The present invention relates to demand responsive transit systems and in particular to apparatus and methods for providing inexpensive, rapid service to and from random locations throughout urban/suburban regions. Current public transit technologies are unable to provide the type and quality of service required to attract customers out of their single occupant vehicles, and current demand responsive technologies, such as dial-a-ride and taxi services, which use manual data entry and vehicle dispatching, cannot provide the productivity per vehicle, speed and convenience that is provided by the present invention.

This invention makes possible operational flexibility, speed of response, and cost effectiveness that is far better than can be achieved with any current transit technology. Because of its flexibility and efficiency, this invention will meet its operating expenses from fares, and will thus not require operating subsidies, unlike any currently available transit technology. This invention further provides the user with the ability to travel expeditiously between his residence and his workplace anywhere within the urban/suburban region. The transit system employs an automated computer dispatching method to provide transportation to any place within local operating areas. The vehicles in this transit system do not follow predetermined routes and do not operate in regard to predetermined schedules. The vehicles begin their shifts without any assigned stops and without basic routes; the vehicles' movements are determined solely by service requests from passengers which are assigned to them by the computer dispatching method. The computer dispatching method provides dispatching of vehicles to service requests in real time.

There is widespread concern over the increasing inadequacy of transportation facilities in and around the major metropolitan areas in the United States. The crisis in transportation in urban/suburban regions is directly attributable to the relentless increase in the number of private automobiles. Freeways are jammed with traffic and are getting progressively worse, while there are no rational alternatives to the use of the private automobile for the vast majority of people. The transportation crisis cannot be solved unless a transit system is developed that can rival the private automobile in terms of speed, cost effectiveness, and convenience.

The present invention is a demand responsive transit system that can provide service of the quality and cost to be competitive with the private automobile, and as such can make a major contribution to solving the transportation crisis in the U.S. or other countries with a similar dependence on the private automobile. In order to accomplish this, the present invention provides fast, comprehensive service throughout local areas such as residential communities, industrial areas, and retail centers and efficiently connects that service with a matrix of destinations throughout the area, including longer transit links.

There are many existing demand responsive systems such as taxi, police, and pickup/delivery services that are dispatched by computer, but these systems rely on voice communications and manual keyboard entry into a central computer This method is much too slow and costly to adapt to the requirements of a comprehensive demand responsive transit system.

Similarly, any transit system based on predetermined routes, even with automated entry and computerized stop selection along the route, would be unable to respond to requests quickly and efficiently enough to provide service quality competitive with private automobiles. The improvements afforded by the present invention can be clearly appreciated by comparing it to a system that has been proposed that is said to improve operating efficiency by skipping stops at unoccupied stations, and by regulating traffic signals along its predetermined route. This system starts with a predetermined, "basic", route, along which are some number of stops. The stops are recognized by the central computer as a numerical series defined by present stop, present stop plus 1, etc. The central computer in this system queries the next predetermined stop along the route, i.e. present stop plus 1, to determine if there is a reason, such as a waiting passenger or a disembarking passenger, to stop at the next stop. If the determination is no, the vehicle is instructed to "skip" the stop, and continue travelling towards the next predetermined stop, at which time the central computer performs the same series of queries regarding the next predetermined stop.

Unless the vehicles are instructed otherwise by the central computer, the vehicles will stop at each predetermined stop in their predetermined order while traveling along their predetermined route. Assuming there were no passengers on a vehicle, and no passengers at any of the vehicle's assigned stops, the vehicle would continue to travel along its route without ever stopping. The central computer would query each upcoming stop in turn and instruct the vehicle to skip each stop in turn, until the vehicle had traveled a complete run, at which time the vehicle would begin travelling its route over again without having provided any useful service to passengers, i.e. its efficiency would be zero.

In essence this system starts with an upper limit of number of stops to service along its route, and the central computer eliminates some of those stops along the way, using logic based on a predetermined, linear progression of stops.

The present invention starts with no predetermined series of stops and no predetermined route, and the central computer logic never concerns itself with service request terminals that are not the pickup or destination location of a current user of the system. The vehicles in this system do not travel unless/until a service request is dispatched to them by the central computer, at which time they travel to the dispatched request and destination along the path determined by the vehicle operator. In essence, the present invention starts with zero stops and the central computer continually adds stops in response to service requests, which are received in random order from random locations. Thus, if there were no passengers aboard a vehicle, and no service requests at any terminal, the vehicle would remain stationary, i.e. its efficiency would be essentially 100%.

SUMMARY OF THE INVENTION

Pursuant to the present invention, a demand responsive transportation system is provided in automated local service areas, i.e. cells. Cells are geographically identifiable areas such as entire communities, individual neighborhoods, industrial parks, or shopping areas. The transportation system service to a comprehensive matrix of possible origins and destinations within the cell, and can also be linked with either freeway vehicles or with corridor transit systems to provide a comprehensive matrix of possible origins and destinations throughout the region.

The invention provides that a number of relatively small vehicles, such as vans, operate in the cell at any one time. When a vehicle begins operations for the day, it signals the central computer that it is available for service and informs the central computer of its location, which can be anywhere within the cell. At that time, and until the central computer dispatches a service request to it, the vehicle does not have any assigned or anticipated stops, nor does it have any anticipated route, and so does not travel from its initial location.

The invention further provides that service request terminals are installed at frequent intervals throughout the cell and at convenient locations, such as office complexes, apartment complexes, shopping centers, etc.

In response to each individual service request made by passengers at the service request terminals, a central dispatch controller for each cell automatically searches through its file of vehicles in service, their locations, and previously dispatched service requests, and determines which vehicle could serve the requested origin and destination most efficiently. The central dispatch controller then sends a dispatch command with digital radio signals to that vehicle.

The central dispatch controller has the primary function of determining the vehicle which could service each service request, both pickup location and destination, most efficiently. The logic of the central dispatch controller determines efficiency in terms of minimum added distance the vehicle must travel to service the request. In order to accomplish this, the computer in the central control facility maintains a current file of all vehicles in service in the cell, the locations of the vehicles, previously dispatched service request pickup and destination locations, and the projected occupancy of all of the vehicles operating in the cell it controls. When a service request is received, the computer uses this information in its memory and could service the new requested origin and destination among its previously assigned dispatches with minimum added distance, and then transmits the dispatch to the selected vehicle.

The vehicle does not service its dispatches in the order in which they are received; it services the dispatches in the order and on the path which, in the opinion of the vehicle operator, would allow the most expeditious operation of the vehicle. For example, this flexibility allows the vehicle to wait to service an out of the way destination required by a current passenger until a second passenger who has the same or similar out the way destination, is picked up, so that the vehicle does not have to travel to the out of the way location twice. Similarly the central controller can assign a dispatch to a vehicle which would require the vehicle to double back to pick up a passenger recently arrived at a previously serviced service request terminal if the other vehicles in the cell would have to travel farther to service the request.

The service request terminals are small freestanding structures that house a keypad into which the service requests are entered, a computer that manages the operations of the terminal, a radio transmitter and receiver that communicate with the central controller, a farecard processor, and a ticket printer. The terminal is powered by solar energy that is stored in a battery so that the terminals can be easily and quickly installed in the typical outlying sidewalk locations where it would be too costly to run underground utility power to them. The battery power system also eliminates a potential electrical hazard in the event of an accident, forced entry, or servicing in wet weather, and allows the terminal's location to be easily changed in the process of optimizing the system's operations.

The service request terminals can include sensors that detect abuse to the terminals, such as impacts, theft, or arson, in which case the terminal is programmed to automatically signal the central controller of the abuse. The central controller can be programmed to automatically alert either a nearby vehicle or the police of the abuse.

Illumination is provided for use of the terminal during dark operating hours by a fluorescent light that is turned on by a mat switch whenever a passenger stands in front of the terminal. Alternatively, if the continuous electrical drain of the sensor can be accommodated by the solar/battery system, the light may be turned on by an infrared presence sensor of the type that is widely used to control water flow in rest rooms.

Relatively small vehicles such as vans are used to provide the service in the cells. This choice of vehicles is significant for two reasons. First, these vehicles are small and quiet enough to be readily accepted in residential neighborhoods, and do not face limitations regarding the size and quality of the roads to be traversed. Thus, service can be provided throughout the cell, close to homes and other likely destination requests, making the transit system very convenient to use. Second, the operating cost per vehicle mile is modest, because they do not require the services of expensive heavy equipment operators as is the case with buses, and their maintenance cost is a small fraction of that for buses. Thus, the operating cost of the system is reduced to the point that the present invention is calculated to meet its operating expenses from farebox revenues, unlike any other form of public transit.

There are further advantages of the present invention which reduce operating cost and increase service quality. The average speed of the vehicles is high because the small number of passengers on the vehicle requires relatively few stops compared to the large number on a conventional or railcar. The vehicle operators are free to choose the order in which they service dispatches and to choose the path they will follow between service request locations so that maximum advantage can be taken of the flexibility presented by not having predetermined routes and the drivers' knowledge and experience with local roads and prevailing traffic conditions. The vehicles are never required to travel past unoccupied service request terminals or on non-optimum routes as is the case with systems with predetermined series of stops or routes.

The vehicles are equipped with terminals that include a radio transmitter and receiver, an interactive display of the vehicle's dispatched stops, and a computer that manages the functions of the terminal. When a dispatch is received from the central controller, the associated pickup and dropoff locations are displayed as blinking illuminated spots on a map of the cell. The dispatch is automatically accepted after a predetermined time interval, which causes the stop indications to cease blinking. If he cannot service the dispatch for any reason, the vehicle operator may press a reject switch in order to transmit a rejection signal to the central dispatch controller. The controller would then select the next most efficient vehicle for the dispatch. Acceptances are automatically transmitted to the controller and to the service request terminal so that the passenger at the service request terminal is advised of the dispatch with an indicator light or a display of the dispatched vehicle's identification number.

When a dispatched service request has been accomplished, the vehicle operator presses the illuminated spot representing it on the terminal display, activating a switch to advise the vehicle terminal of the completion of the service request. The terminal causes a signal to be transmitted to the central dispatch controller that includes the vehicle's identity, the stop's location, and the occupancy of the vehicle so that the vehicle's position stored in the dispatch control computer's memory is updated and its occupancy confirmed.

Passengers originating in a cell may travel to any place within the cell by requesting the code number of any location within the cell. The vehicle dispatched to service that request will take the passenger to his requested destination while servicing the other dispatches assigned to the vehicle.

Passengers originating in a cell may also travel to any place in the region by making use of a ridesharing vehicle or corridor transit system. This is accomplished by the passenger requesting the destination code of either a relay station near a freeway that passes through the cell or to a transit station.

The relay stations are staging areas in which passengers find ridesharing vehicles, private or public, that are travelling to their destination. Passengers disembarking from a local service vehicle at a relay station seek out the curbside areas that are designated with signs for use by vehicles travelling to their particular destination. If a vehicle is not waiting for a passenger at the area, the passenger enters the number of his destination in one of the ridesharing service request terminals that are located at curbside, and the number is electronically converted to a spoken signal. The signal is then transmitted in numerical sequence among other passengers' requests as a short range signal on a frequency designated for the purpose on the broadcast band. Ridesharing vehicles enter the relay station either routinely or in response to the radio broadcast listing the destination of the waiting passengers. Passengers use the tickets that are issued by the service request terminals to remunerate the ridesharing drivers in simple, cashless transactions.

It is a broad objective of the present invention to provide demand responsive, automatically dispatched transportation systems that will transport passengers to any and all points within local areas in response to service requests occurring at random intervals from random locations. It is a further broad objective of the invention to provide transportation service quality, economy, and convenience of use that are competitive with the private automobile.

It is a further objective of the invention to use the coordinated capabilities of radio linked computers in service request terminals, in transit vehicles, and in a central control facility to manage the operation of fleets of transit vehicles in local service areas and to link those local service areas together by coordinating with freeway vehicles or corridor transit systems to provide comprehensive transportation service throughout an urban/suburban region. It is another objective of the invention to provide a means by which to make use of unused transportation capacity in freeway vehicles as a means of reducing traffic congestion and vehicle emissions.

These and other objectives, advantages, and features of the invention will be apparent from the following description of preferred embodiments, considered along with the accompanying drawings.

DETAILED DESCRIPTION OF THE PREFERRED EMBODIMENTS

Figure 1:
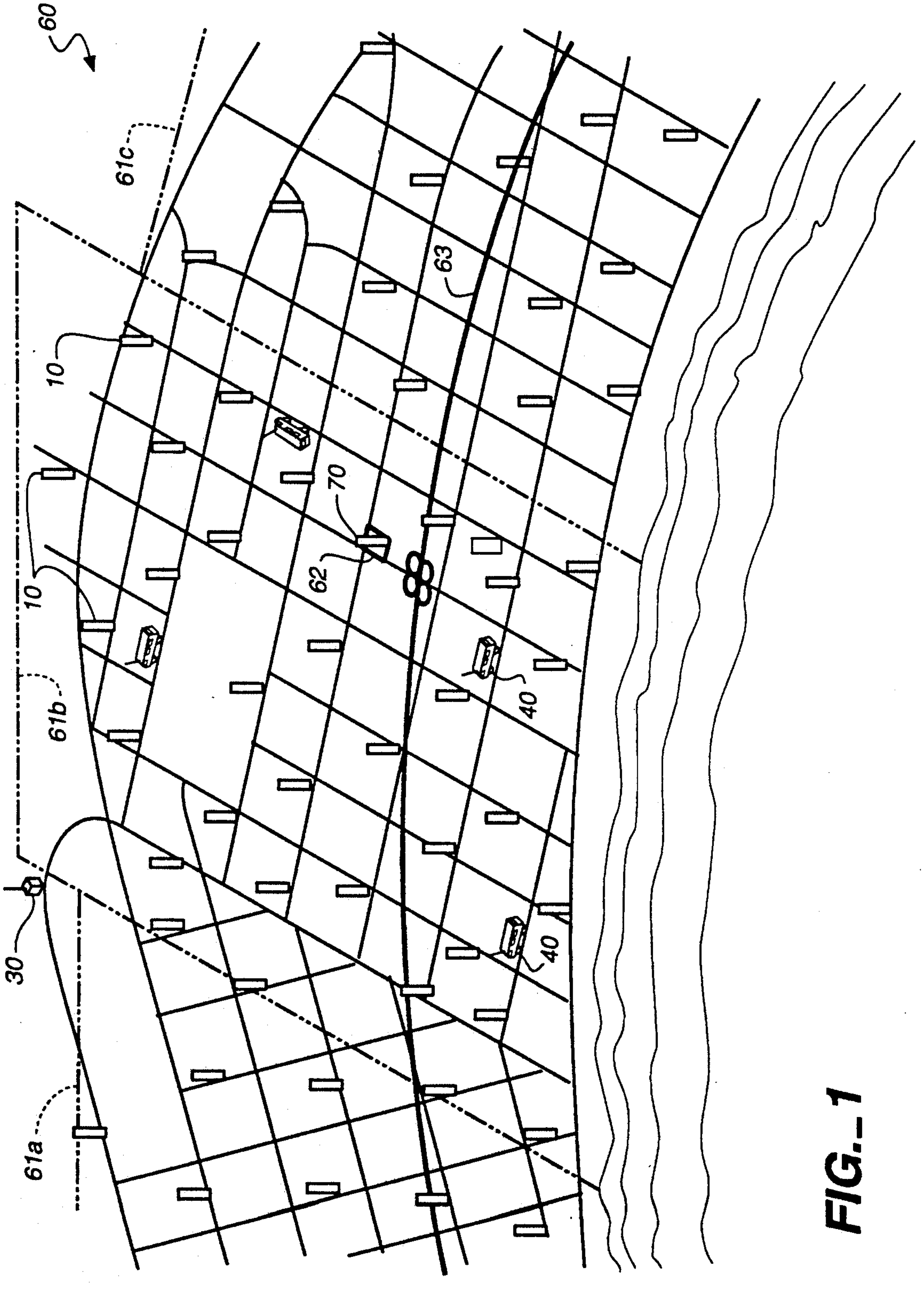
FIG. 1 is a schematic map showing a preferred embodiment of a cell of the present transit system.

The present invention encompasses methods and apparatus for establishing local transit areas or "cells". The local transit areas are able to interact with freeway vehicles or corridor transit systems to establish comprehensive transportation service throughout urban/suburban regions. Referring to FIG. 1, the region 60 is divided into continuous cells 61*a*, 61*b*, and 61*c* for defining the operating areas of automatically dispatched local transit systems. Cells can range in size from 2 square miles to over 60 square miles, depending on the population density and geographic boundaries of the local area. Each of the calls 61*a*, 61*b*, and 61*c* is provided with a central dispatch controller 30 that is located within reliable radio transmission range of all points within the cell. Relay station 62 is located adjacent to freeway 63 in the cell 61*b* which is typical of cells 61*a* and 61*c*. Ridesharing service request terminal 70 is located in the relay station 62.

Referring again to FIG. 1, a number of service request terminals 10 are located throughout the cell at frequent intervals. Placement of the terminals is determined by a maximum distance a passenger would have to walk to reach a terminal from any location in the cell, and logical locations close to activity centers such as residential complexes, commercial centers, popular recreation spots etc. The service request terminals 10 are used by passengers to communicate requests for service to a central dispatch controller 30 that is located in the region that includes the service cell.

Figure 4:
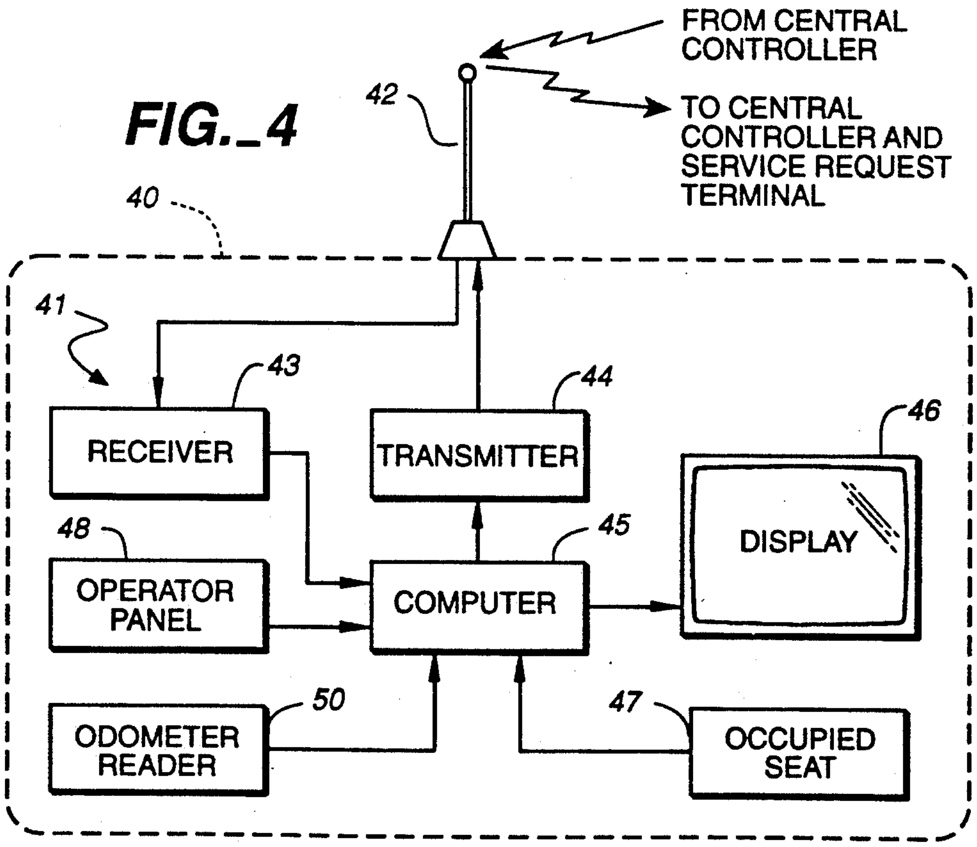
FIG. 4 is a schematic diagram of the vehicle terminal and display.

Each cell is serviced by a fleet of transit vehicles 40 that are equipped with a vehicle terminal 41 as shown in FIG. 4. The vehicle terminals are used to receive dispatch signals from the central dispatch controller 30 and to display the dispatches graphically to the vehicle operator among the previously dispatched requests.

The vehicle terminal also transmits data such as the occupancy of the vehicle and its location to the central dispatch controller for the controller's use in selecting the most appropriate vehicle to service each particular service request. Vehicle occupancy information is provided to the terminal by pressure sensitive switches 48 in the passenger seats 49 that sense the presence of a passenger in the seat. The vehicle terminal also allows the vehicle operator to signal the central dispatch controller when the vehicle operator wishes to reject a dispatch command.

Figure 2:
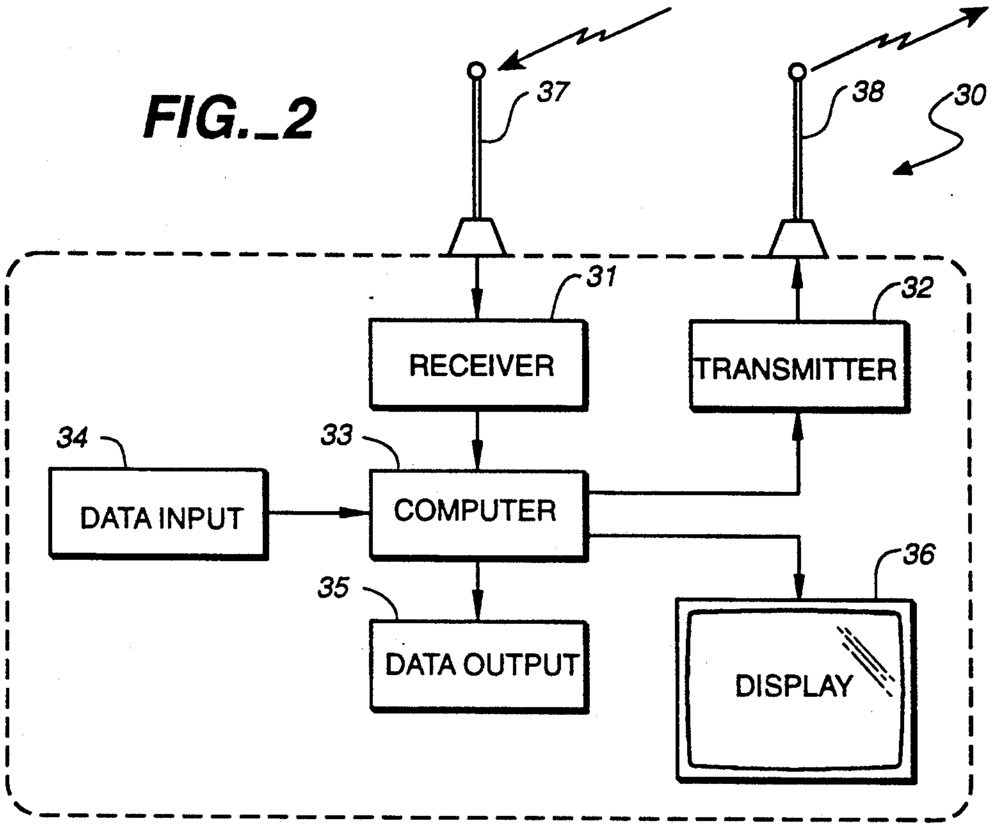
FIG. 2 is a schematic diagram of the central dispatch controller as used for the cells of the embodiment shown in FIG. 1.

Referring now to FIG. 2, the central dispatch controller 30 has a radio receiver 31 and antenna 37 for receiving data relating to service requests and detected abuse from service request terminals 10, and also for receiving information from vehicle terminals 41. The controller also includes a computer 33 that is provided with a stored street map of the cell 51 with locations of the service request terminals 10 by input device 34. Display 36 is a cathode ray tube or similar electronic display device that shows the map of the cell 61, the locations of the service request terminals 10, and the locations of vehicles 40 operating in the cell as determined from the memory in the computer 33. The display 36 is provided for the information of personnel who are responsible for the management of the cell. Transmitter 32 and antenna 38 receive dispatch data from computer 33 and transmit it to the vehicle terminals 41. Output data device 35 receives and stores data from computer 33 relating to the operation of vehicles 40 for later use by accounting and management personnel.

Figure 3:
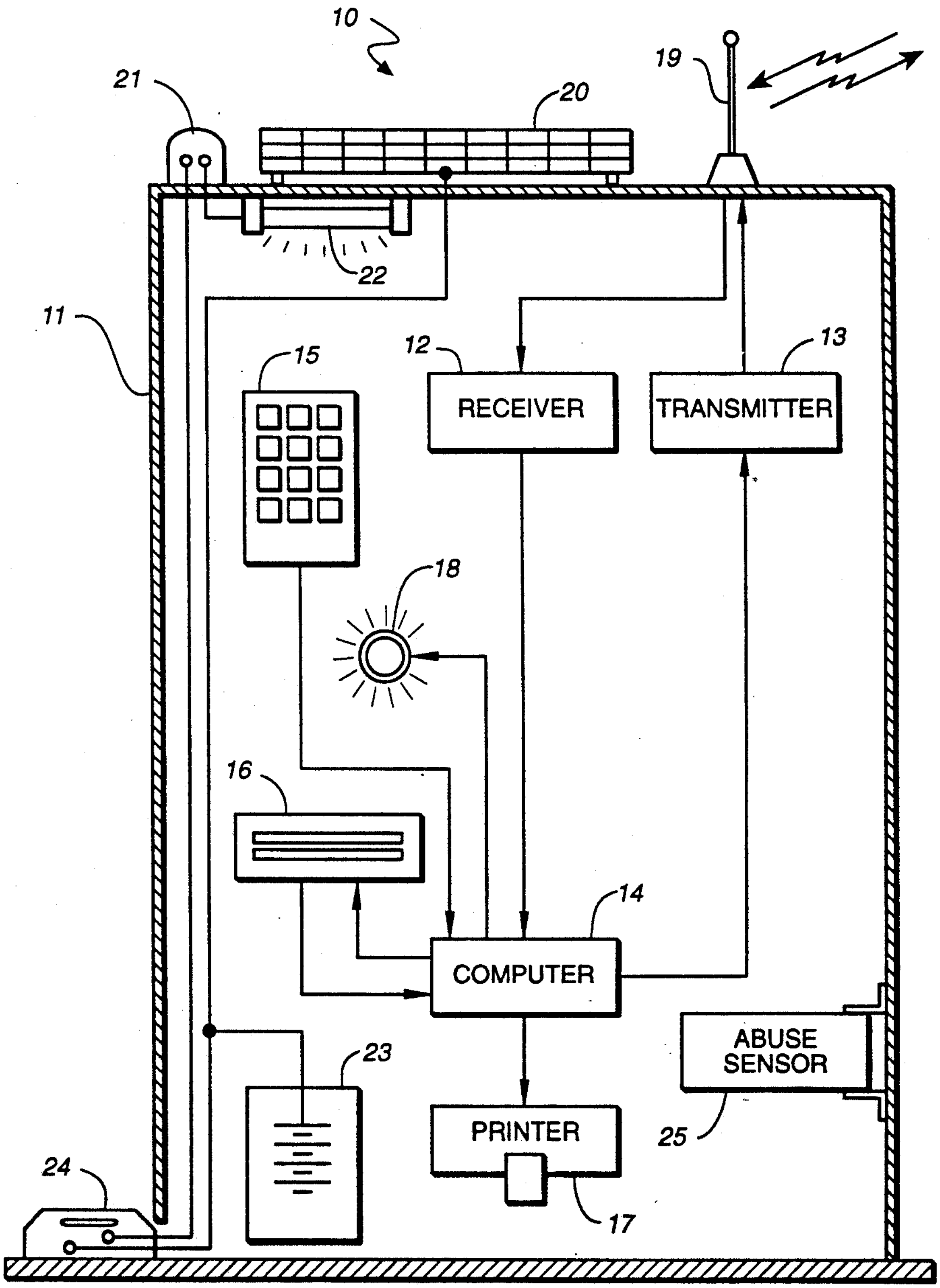
FIG. 3 is a schematic diagram of the service request terminal as used in the cells of the embodiment shown in FIG. 1.

As shown in FIG. 3, each service request terminal 10 is enclosed in a freestanding enclosure 11 that is attached to a sidewalk or other convenient surface. The terminal 10 includes radio signal receiver 12 for receiving information from the central dispatch controller 30, radio signal transmitter 13 for transmitting service requests and terminal location data to the central dispatch controller, and transmit/receive antenna 19. Digital keypad 15 is used by passengers to enter the digital code for their destination. Card reader 16 receives a farecard (not shown) having a magnetic code, reads the fare value of the card from the magnetic code, and then writes a new coded value after the computer 14 has subtracted the fare to the requested destination. Alternatively, each passenger may have an account that is debited for the cost of his trip by a billing computer associated with the central dispatch controller. Indicator light 18 lights when a vehicle 40 has been dispatched to the terminal location by the central dispatch controller. Ticket printer 17 issues a ticket having the origin and destination numbers printed in arabic numbers and machine readable code in response to each service request.

In other embodiments the cardreader 16 can include the ability to read from the farecard additional data such as the cardholder's identity for use in acquiring statistics or for use in a billing and accounting system.

Service request terminals 10 are equipped with an abuse sensing device 25 that is capable of sensing an abusive event such as a blow, dislocation, or excessive heat. Such an abuse sensing device may be of any suitable type such as inertial sensitive switches used in automobile alarm systems. When an abusive event is sensed, it causes the computer 14 to initiate a message to be transmitted by transmitter 13 to the central dispatch controller 30 which then automatically notifies the authorities.

Power to operate the terminal 10 is provided by a storage battery 23 that is charged during daylight hours by a solar cell array 20 mounted on the top of enclosure 11. The power system thus need not be connected to utility power lines so that the terminals can be readily installed at random locations and in outlying areas, which would not be the case if the terminals were powered from a utility power line.

Fluorescent light 22 is provided in the service request terminal 10 to allow its use at night. Mat switch 24 directs operating power to the light through a circuit that includes a normally closed photoelectric switch 21 so that switch will be closed and the light will operate only at night when a passenger is standing in position to use the terminal.

Figure 7:
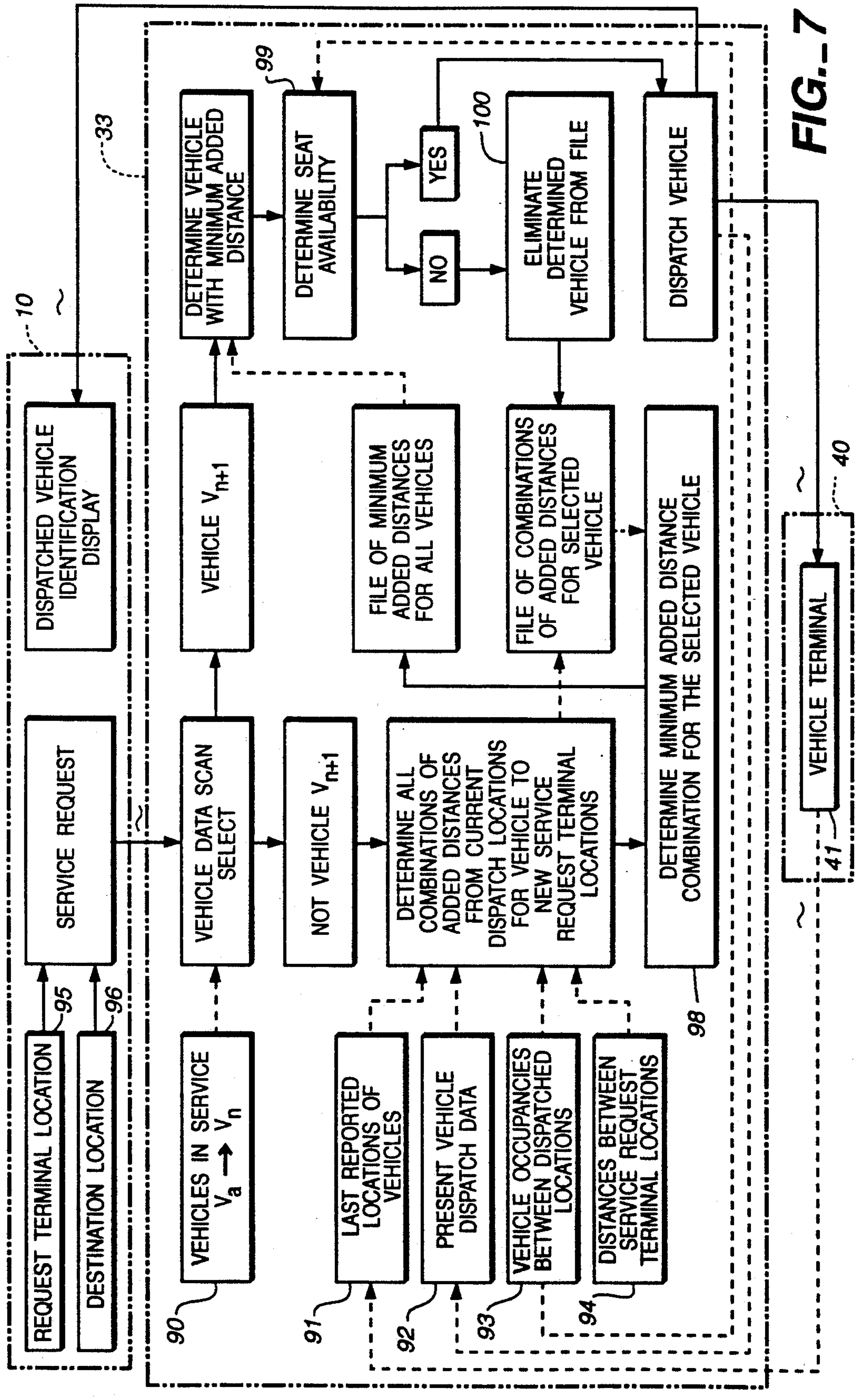
FIG. 7 is a flowchart of the steps used by the central computer to determine dispatch assignments.

Referring now to FIG. 4, vehicle terminal 41 includes antenna 42 and radio receiver 43 for receiving digital signals from the central controller 30; computer 45 for providing the operational logic. FIG. 7, for the terminal and for managing the execution of its functions, operator panel 48; and radio transmitter 44 for transmitting information to the central controller and to service request terminals. Display 46 is located in the view of the vehicle operator in order to graphically display the dispatch signals that have been received from the central dispatch controller 30. The vehicle terminal also includes a set of seat occupancy sensors 47 that provides the real time vehicle occupancy information that is required by the central dispatch controller's logic in order to dispatch the vehicle correctly. Where operators are remunerated on the basis of vehicle miles of service provided, an odometer reader 50 is included in the terminal to provide the needed information.

Figure 5:
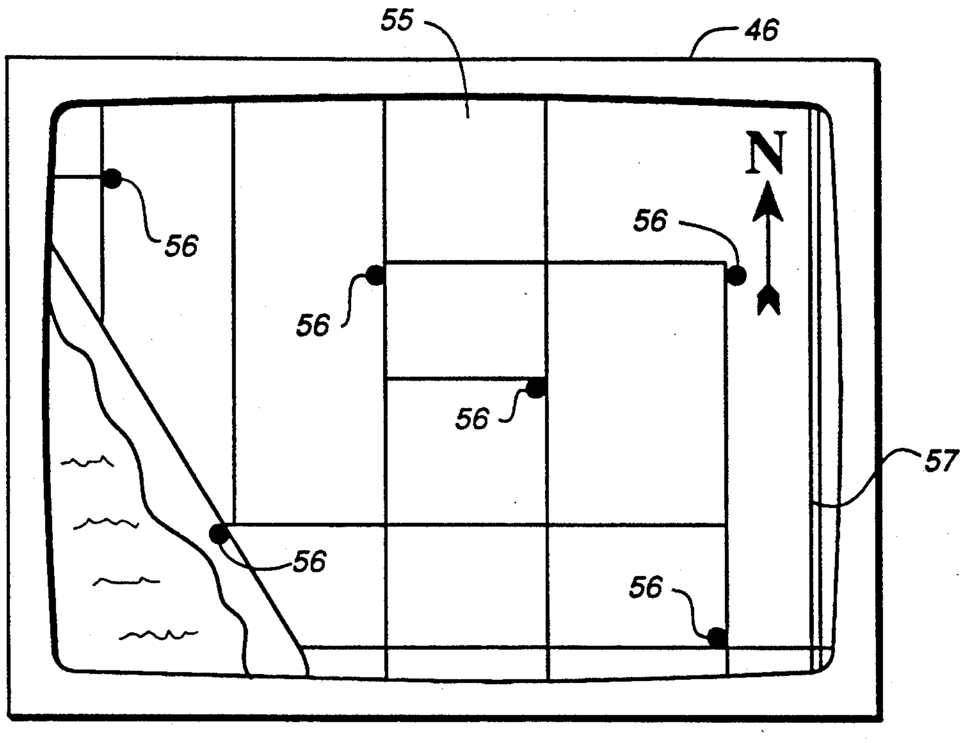
FIG. 5 is a plan view of the dispatch display in the vehicle terminal.

The display 46 illustrated in FIG. 5 includes a map 55 of the cell area served by the vehicle that is mounted on a rigid panel 57 with LED indicator and switch devices 56 representing the position of each service request terminal in the cell. A dispatch command that is coded for the vehicle is received by receiver 43 and the service request terminal 10 that originated the request, and is used as an input to computer 45. The computer decodes the command signal and outputs signals to cause the LED indicators 56 representing the locations of the originating service request terminal and the desired destination to blink. This allows the vehicle operator to comprehend at a glance the locations of the new dispatch among previously received dispatches. The interactive display 46 can also be used by the operator to reject a dispatch by pressing the blinking indicator 56, which causes the computer 45 to generate a coded signal to the central dispatch controller 30 and the service request terminal 10 that the dispatch has not been accepted. If the operator does not reject the dispatch during a programmed interval, the dispatch is accepted automatically and the associated LED indicators 56 stop blinking and are illuminated steadily.

When a vehicle reaches a dispatched service request terminal, the operator presses the corresponding LED indicator switch 56. This action causes the computer 45 to assemble a coded signal that is transmitted by transmitter 44 to the central dispatch controller 30 that includes the identification of the vehicle, the location of the service request being served, and the number of occupied seats on the vehicle as sensed by seat sensors 47. This keeps current the information relating to the particular vehicle that is stored in the dispatching computer's memory.

In another embodiment, the display can consist of an electronic display such as a cathode ray tube or a liquid crystal display with a capacitive or infra red touch sensing screen that senses the position of the operator's finger when he touches a particular stop indication on the display map.

Figure 6:
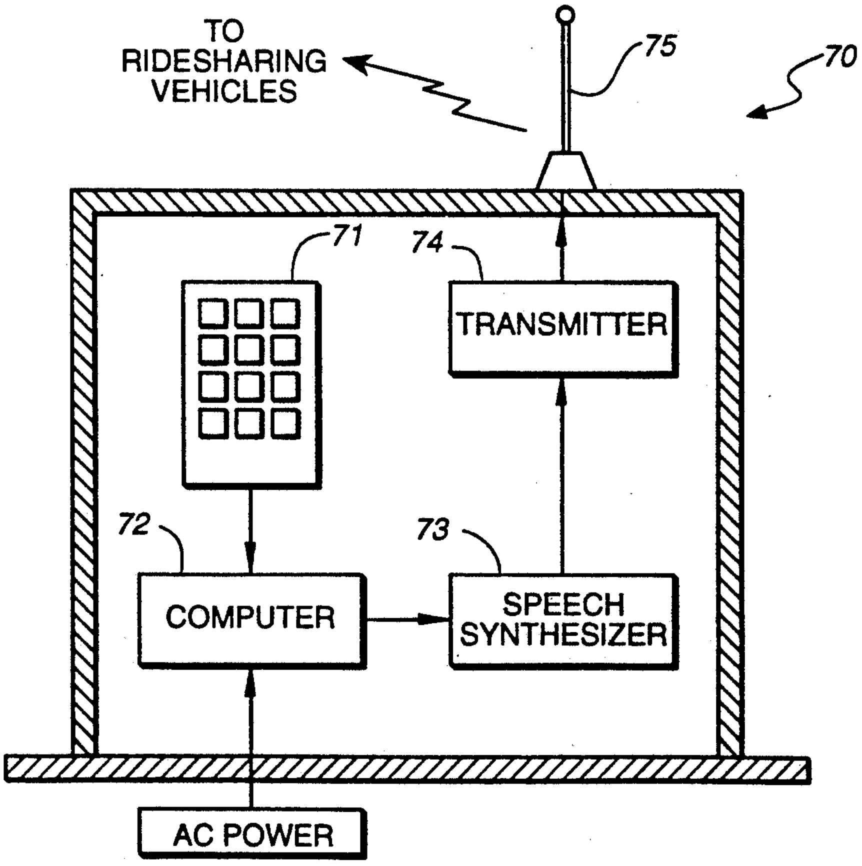
FIG. 6 is a schematic diagram of the ridesharing service request terminal.

If the final destination of the passenger requires an intercell link, the vehicle drops the passenger off at a relay station or corridor transit system station. As shown in FIG. 6, ridesharing service request terminal 70 is used by passengers that have disembarked at relay station 62 to communicate with vehicles on the freeway. The passengers enter their destination number in the terminal using the digital keypad 71. On receipt of the input from the keypad, computer 72 adds the new request in numerical sequence to a list of such requests from other passengers in the relay station, and converts the digital input to a spoken number with a speech synthesizer 73 before transmitting it using transmitter 74 and antenna 75 as a short range radio signal on an assigned frequency on the broadcast band.

Referring now to FIG. 7, a flowchart is shown wherein the computer 33 in the central dispatch controller 30 continually maintains and updates its files of the identification of each vehicle in service with the cell 90, the last reported location of each vehicle 91, the dispatches to each vehicle are currently assigned 92, the seat availability on each vehicle 93, and the distances between service request terminals 94.

The central dispatch computer 33 receives a service request signal from a service request terminal 10. The service request signal includes the code of the location of both the service request terminal where the passenger is to be picked up, designated 95 and the passenger's destination 96.

The computer 33 determines for each van 40 operating in the cell the minimum travel distance that would be added to service the new service request. For each van, the computer determines the distance from the closest present dispatch to the new origin and the distance from the closest present dispatch to the new destination 97. The computer then adds the two distances for each van and determines which van can service the new request with minimum added distance 98. The computer then determines whether the van with the minimum added distance would have a seat available for the new passenger 99. If a seat is not available, the controller eliminates that van from its current minimum added distance file 100. The computer then determines the van with the next least added distance 98, and determines whether a seat would be available on it 99. Once an appropriate vehicle is identified, the central dispatch controller 30 sends a dispatch command to the terminal 41 in the selected van 40.

Figure 8:
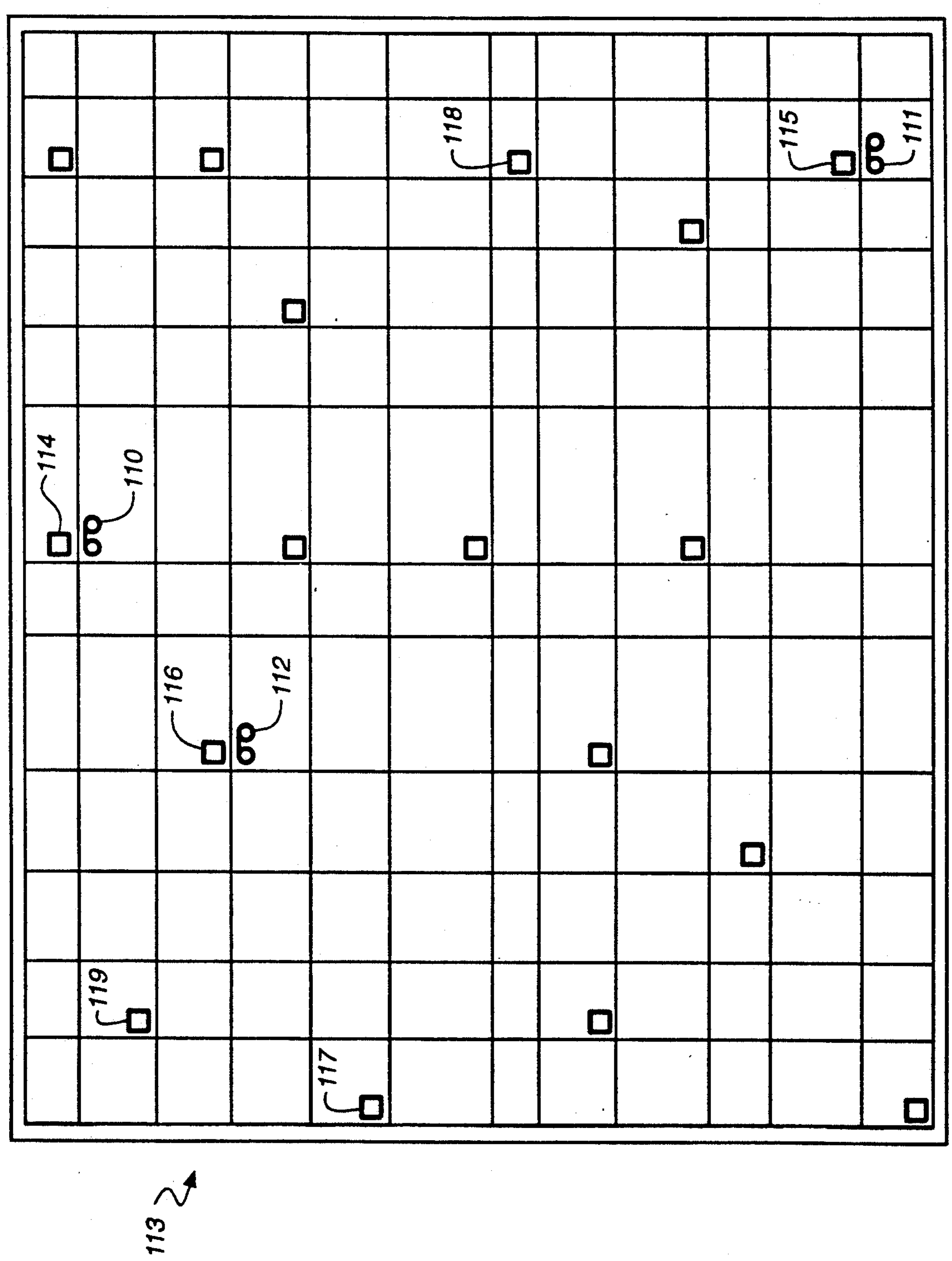
FIG. 8 is a schematic diagram of the current locations of vehicles in a cell in order to illustrate the operation of vehicles in response to a series of service requests.

Referring now to FIG. 8, vehicles 110, 111 and 112 are operating in cell 113 and are currently located at service request terminals 114, 115 and 116 respectively. Vehicle 110 has one passenger whose destination is terminal 119. Vehicles 11 and 112 do not currently have any passengers or any assigned dispatches. A service request is received from terminal 117 to go to terminal 118. The central dispatch computer, using the steps outlined in FIG. 7, determines that:

Vehicle 111 would have to travel 16 blocks to terminal 117 and 12 blocks from terminal 117 to 118. Total added travel distance would be 28 blocks.

Vehicle 112 would have to travel 5 blocks to terminal 117 and 12 blocks from terminal 117 to 118. Total added travel distance would be 18 blocks.

Vehicle 110, which has a current dispatch to go to terminal 119, would have to travel 4 extra blocks from terminal 119 to terminal 117 and 12 blocks from terminal 117 to 118. Total added travel distance would be 16 blocks.

The computer 33 determines that vehicle 110 would have the least distance added, and it then determines from its file 93 that vehicle 110 would have a seat available. Since vehicle 110 has a seat available for the new passenger, central dispatch controller 30 sends the dispatch command to the terminal in vehicle 110.

The operation of the present invention can now be briefly described with reference to FIGS. 1 through 8.

A user of the system initiates the operation of the system by making a request for service at one of the service request terminals 10 in an operating cell **61*a* in the region 60 served by the transit system. The user stands on a mat switch 24 while operating the service request terminal thereby supplying voltage to a photoswitch 21. At night the photoswitch 24 is closed due to the absence of light, causing the voltage to illuminate the fluorescent light 22 so that the user can adequately see the equipment in the service request terminal 10. The user indicates his destination by entering its code number in a digital keypad 15 and then inserts his magnetically coded farecard (not shown) in the card reader 16 so that the fare can be processed. Card reader reads and erases the coded value on the card. Computer 14 calculates the new value of the card by subtracting the fare to the requested destination from the value of the card and causes the card reader to magnetically encode the new value on the card. The computer 14 then composes a digitally coded service request signal that includes the terminal's location and the number of the requested destination and causes the transmitter 13 to transmit it to the central dispatch controller 30. The computer 14 also causes the ticket printer 17** to issue a ticket with the numbers of the service request terminal and the destination printed on it in arabic numbers and a machine readable code.

In response to the service request signal that was transmitted by the service request terminal 10 and received by receiver 31, the computer 33 in the central dispatch controller 30 searches through the data in its memory files relating to the position, previously dispatched service requests, and occupancy of each of the vehicles 40 operating in the local service cell. The computer assigns the incoming dispatch to a vehicle 40 in the cell on the basis of a determination that the total added distance to service the pickup and destination locations in relation to its previously dispatched service requests would be less than would be the case for other vehicles in the cell, and that the vehicle would have a seat available for the new passenger as shown in FIG. 7. The computer 33 then assembles a dispatch command signal that includes the identity of the selected vehicle and the request terminal and the new destination, and then causes transmitter 32 to transmit the dispatch signal.

The receiver 43 in the selected vehicle 40 receives the dispatch signal, and the computer 45 in the vehicle terminal 41 recognizes the vehicle's identity in the signal and processes the dispatch data so that the positions of the service request terminal and destination in the dispatch signal are indicated on the map of the cell area in the display 46. The new dispatch locations are displayed with blinking indicator LEDs in the indicator switches 56, or blinking spots if the display 46 is a cathode ray tube or liquid crystal screen, until the dispatch is accepted after a programmed time interval. In the absence of a rejection, the computer 45 in the vehicle's terminal automatically assembles an acceptance signal that includes the identities of the vehicle 50 and the newly dispatched request terminal 10 and transmits it to the central dispatch controller 30 and the newly dispatched service request terminal 10. The computer 45 in the vehicle terminal 41 then causes the newly accepted dispatch locations to be displayed with unblinking indicator switches 56 among the similarly illuminated indicator switches 56 representing other previously dispatched service requests.

The dispatched vehicle 40 continues to service its dispatched pickup and destination locations in the most appropriate order using the most efficient travel path as determined by the operator in view of his experience in travelling throughout the service cell and his awareness of traffic conditions prevailing at the time, until the vehicle arrives at the newly dispatched pickup location. Once the passenger is aboard the vehicle, the operator presses the associated brightly illuminated indicator switch 56 on the display 46 which causes the computer 45 in the terminal 41 to assemble and transmit a digital signal advising of a service request completion that includes the identity of the vehicle, the identity of the service request terminal 10, the number of passengers aboard as sensed by seat occupancy sensors 47, and the odometer reading of the vehicle 40.

The central dispatch controller 30 receives the service request completion signal and computer 33 updates the information in its memory files relating to the location 91 and occupancy 93 of the reporting vehicle 40. These data are used by the computer 33 for determining optimal vehicle dispatches as has been described and are made available using data output device 35 to an accounting system for compensating vehicle operators on the basis of the passenger miles of service that the operator has provided.

The vehicle continues to service dispatched service requests, which may include a relay station 62 as shown in FIG. 1 where passengers that are travelling to destinations outside of the local service cell disembark. The passenger seeks out a curbside area that displays the number of his destination and finds that a ridesharing vehicle to his destination is not present. He then enters his destination number in a keypad 71 of a ridesharing request terminal, which broadcasts it as a spoken request with a short range radio transmission. A ridesharing automobile on the freeway 63 recognizes the destination number as being near to the automobile's destination and enters the relay station to pick up the passenger. The passenger gives his ticket to the driver and the passenger is driven to his destination.

In the embodiment described above, the central dispatch controller 30 dispatches only local transit vehicles. The regional transit vehicles are either private automobiles or vans, or are transit vehicles operating on fixed routes and schedules that are fed with passengers by the automatically dispatched local transit vehicles. In another embodiment of the present invention, however, the regional transit vehicles are also dispatched by the dispatch controller 30 in response to service requests with a method similar to the way in which local transit vehicles are dispatched.

Where the regional transit vehicles are also automatically dispatched, the regional vehicles are also equipped with vehicle terminals 41 similar to those described for local transit vehicles. The central dispatch controller 30 responds to the user request not only by dispatching a local transit vehicle to the service request terminal 10 but also by dispatching a regional transit vehicle to the projected relay station in order to provide a prearranged regional transportation link.

In another embodiment the card reader 16 of the service request terminal 10 does not read a farecard but rather an I.D. card. Entering the I.D. card causes an accounting computer connected to the central dispatch controller to store the fares for service provided to the user and to periodically generate a bill that is sent to the user for payment. In yet another embodiment, the user enters a bank credit card that is debited for the fare.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A demand responsive, automatically dispatched transit system for a fleet of transit vehicles serving urban and suburban regions in which local transit vehicles are dispatched in real time in response to individual requests for the system to provide transportation service from any location within the local service area to any location within the local service area, comprising:

central dispatch controller means, said controller means including a telecommunication channel for receiving destination requests from prospective passengers and a telecommunication channel for communicating assigned dispatches to transit vehicles and receiving occupancy and vehicle location data from said vehicles, and a computer means programmed to process the received information together with stored request means in order to determine which of said vehicles can service a received destination request with minimum added travel distance, by the steps of:

(a) determining which dispatches previously assigned to each vehicle are closest to the origin and destination locations of the new service request;

(b) determining the distance from the closest previously assigned dispatches to the origin and destination locations of the new service request;

(c) calculating the total added distance for each vehicle to service the new request;

(d) determining which vehicle would have the minimum total added distance to service the new request;

(e) determining whether the vehicle with minimum added distance would have a seat available for the requesting passenger;

(f) if no, determining which of the other vehicles would have the next least total added distance to service the request;

(g) if yes, transmit the dispatch to the terminal in that vehicle, service request terminal means placed at frequent intervals and convenient locations linked by a telecommunication channel with said computer means, said service request terminal means including a data entry device operable by prospective passengers for communicating desired destinations to the central dispatch controller means, and a display means for indicating the identity of vehicles that have been assigned to provide service to said requested destinations, and;

dispatch terminal means aboard each vehicle in communication with said central dispatch controller means, said dispatch terminal means including an interactive display means to indicate the location of service requests assigned to the vehicle by said central dispatch controller means and for communicating the location of the vehicle to said central dispatch controller, and means for sensing and communicating the occupancy of the vehicle to the central dispatch controller means.

2. The transit system of claim 1 wherein the transit system is able to interface with regional transit vehicles at relay stations for providing rapid service throughout the regional area.

3. The transit system of claim 1 wherein the service request terminal means include keypad means for entering service request information, first transmitter means for transmitting information to the central dispatch controller, first receiver means for receiving information from the central dispatch controller, first computer means for processing the fare to the requested destination and for controlling the operation of the service request terminal means.

4. The transit system of claim 3 wherein the first transmitter means is a radio signal transmitter and the first receiver means is a radio signal receiver and wherein the information transmitted and received by the service request terminal means is in the form of digital radio signals.

5. The transit system of claim 3 wherein the request terminal means are mounted in freestanding enclosures.

6. The transit system of claim 5 wherein the power for the service request terminal means is provided by a solar cell array and a storage battery mounted in each enclosure.

7. The transit system of claim 6 further including a lighting means for illuminating the terminal for nighttime operation.

8. The transit system of claim 7 wherein the lighting means includes a fluorescent lamp, a photoswitch that allows the lamp to operate only in the darkness, and a switch means for providing electric power to the lamp and photoswitch only when a user stands in position to use the terminal.

9. The transit system of claim 3 wherein the service request terminal means further includes an abuse sensing means for sensing abuse of the terminal and for initiating a signal indicating such abuse and for causing the terminal means to transmit said signal to the central dispatch controller means and wherein the central dispatch controller means includes means for notifying authorities on receipt of said signal.

10. The transit system of claim 1 wherein the central dispatch controller means includes second receiver means for receiving signals from the service request terminal means and the vehicle terminal means, second transmitter means for transmitting signals to the vehicle terminal means, and second computer means for searching through data concerning transit vehicles operating in the area of the request, for selecting the local transit vehicle that can most effectively respond to each service request, and for generating a dispatch signal that is transmitted by the second transmitter means to the selected vehicle.

11. The transit system of claim 10 wherein the second transmitter means is a radio transmitter and the second receiver is a radio receiver and wherein the signals received by the second receiver means and the signals transmitted by the second transmitter means are in the form of digital radio signals.

12. The transit system of claim 10 wherein the central dispatch controller means includes input data means for storing and supplying data relating to the locations of service request terminals and streets in the local area to the second computer means in the central dispatch controller means.

13. The transit system of claim 10 wherein the central dispatch controller means includes data output means for receiving data relating to system operations from the second computer means in the central dispatch controller means.

14. The transit system of claim 13 wherein the second computer means in the central dispatch controller means includes means for generating accounting reports, traffic flow reports, system performance reports, passenger billing reports, and driver remuneration reports which are output to the data output means.

15. The transit system of claim 1 wherein the vehicle terminal means includes third receiver means for receiving signals from the central dispatch controller, third transmitter means for transmitting signals to the central dispatch controller means and service request terminal means, third computer means for controlling the operation of the vehicle terminal means, occupancy sensing means for sensing seat availability on the vehicle and causing said seat availability information to be transmitted by third transmitter means to the central dispatch controller, and interactive display means for displaying the dispatch commands received from the central dispatch controller means and for allowing the vehicle operator to communicate with the central dispatch controller means.

16. The transit system of claim 15 wherein the interactive display means includes a surface having a map central dispatch controller of the vehicle's service area imprinted thereon and indicator switch means located on the map to correspond with the locations of service request terminal means and major destinations in the vehicle's operating area for indicating the location of the service request terminal means to be serviced in response to a dispatch command sent by the central dispatch controller means and for allowing the operator to communicate with the central dispatch controller means when the command has been serviced.

17. The transit system of claim 16 wherein the interactive display means is a CRT display with a light pen for allowing the operator to communicate with the central dispatch controller means.

18. The transit system of claim 16 wherein the vehicle occupancy sensing means includes pressure sensitive switches located in each passenger seat in the vehicle.

19. The transit system of claim 15 wherein the interactive display means is an electronic display with a touch sensitive screen for allowing the operator to communicate with the central dispatch controller means.

20. The transit system of claim 1 wherein the regional transit vehicles are equipped with vehicle terminal means and are automatically dispatched by the central dispatch controller means to service relay stations in response to service requests.

21. The transit system of claim 1 wherein the relay stations include a station transmitter means for transmitting destination information concerning passengers waiting for regional transit vehicles at the relay station and wherein the regional vehicles are equipped with destination receiver means for receiving and for displaying the destination information transmitted by the station transmitter means so that the vehicle operator can stop to pick up passengers at appropriate relay stations.

22. A method for automatically dispatching transit vehicles in real time in response to individual service requests in which local transit vehicles operate in local service areas for providing transportation service from any location to any location within the local service area and can interface with regional transit vehicles at relay stations for providing transportation service throughout the regional area, comprising the steps of:

transmitting a service request signal from a service request terminal;

receiving the signal transmitted from the service request terminal by a central dispatch controller;

searching through data concerning transit vehicles operating in the area of the service request with the central dispatch controller;

selecting, with the central dispatch controller, the local transit vehicle which can most effectively service the request, as determined by the minimum added distance of travel to accomplish the service request;

transmitting a dispatch command signal to the selected vehicle from the central dispatch controller;

receiving the dispatch command signal at a vehicle terminal in the selected vehicle and displaying the dispatch command to the operator of the vehicle so that the operator can service the request.

23. The method of claim 22 wherein the transmitted signals are in the form of digital radio signals.

24. The method of claim 22 wherein service request terminals are located at frequent placement intervals throughout the area serviced by the transit system.

25. The method of claim 22 including the steps of manually entering the service request at the service request terminal by the requesting passenger and converting the tendered request to a digital signal for transmission to the central dispatch controller.

26. The method of claim 25 including the steps of reading an I.D. code from an I.D. card with a card reader at the terminal and verifying whether the requesting passenger is a bona fide passenger using the I.D. code.

27. The method of claim 25 wherein the request is manually entered by entering a destination code with a digital keypad at the service request terminal.

28. The method of claim 27 including the step of printing the requested destination code and the trip origin on a ticket issued for the requesting passenger.

29. The method of claim 27 including the step of processing the fare to the requested destination by a service request computer in the service request terminal.

30. The method of claim 29 including the steps of entering an account number at the service request terminal, transmitting the account number and the processed fare to the central dispatch controller, and billing the processed fare to the account number with the central dispatch controller.

31. The method of claim 29 wherein the fare is processed by reading the initial value of a farecard with a card reader, calculating the fare and subtracting the fare from the initial card value to find the new card value, and replacing the initial card value with the new card value.

32. The method of claim 22 including the steps of transmitting a vehicle dispatched signal from dispatch controller to the service request terminal once the central controller has selected a vehicle and transmitted a dispatch command, receiving the vehicle dispatched signal by the service request terminal, and indicating that a vehicle has been dispatched with an indicator at the service request terminals.

33. The method of claim 22 including the step of outputting data concerning system operation to a data output device of the central dispatch controller.

34. The method of claim 22 including periodically transmitting vehicle location data to the central dispatch controller from the vehicle terminal.

35. The method of claim 22 including the steps of sensing seat availability with the vehicle terminal and transmitting seat availability to the central dispatch controller from the vehicle terminal upon every change in seat availability.

36. The method of claim 22 including the step of transmitting a refusal signal to the central dispatch controller from the vehicle terminal in response to a dispatch command which the vehicle operator cannot service.

37. The method of claim 22 including the steps of transmitting an out-of-service status signal to the central dispatch controller from the vehicle terminal when the vehicle is out of service and transmitting an in-service status signal when the vehicle is back in service.

38. The method of claim 22 including the steps of providing said vehicle terminal with blinking indicator lights and causing said light to blink in response to a signal indicating a newly received dispatch command.

39. The method of claim 22 including providing a bright indicator light and activating it in response to a signal from the central dispatch controller to identify the next stop location.

* * * * *